United States Patent [19]
Forman

[11] 4,222,157
[45] Sep. 16, 1980

[54] ROPE TIGHTENER

[75] Inventor: Hugh M. Forman, Waukesha, Wis.

[73] Assignees: David C. Fisher; Mary F. Fisher, both of Fresno, Calif.

[21] Appl. No.: 962,853

[22] Filed: Nov. 22, 1978

[51] Int. Cl.² .......................................... F16G 11/00
[52] U.S. Cl. ................................................ 24/129 A
[58] Field of Search ............ 24/129 R, 129 A, 129 B, 24/129 D, 128, 115 H, 130; 135/15 CF

[56] References Cited

U.S. PATENT DOCUMENTS

| | | | |
|---|---|---|---|
| 666,400 | 1/1901 | Tregoning | 24/129 A |
| 928,469 | 7/1909 | Miles | 24/129 R |
| 1,422,804 | 7/1922 | Witte | 24/129 R |
| 3,050,803 | 8/1962 | Hulterstrum | 24/115 H |

Primary Examiner—Kenneth Downey
Attorney, Agent, or Firm—Wheeler, Morsell, House & Fuller

[57] ABSTRACT

A rope tightener for a rope under tension such as a tent rope formed from a single piece of plastic forming two pairs of parallel legs, the respective legs of each pair having opposed hooks formed at the end of the leg to cooperate in forming a hole through the pair of legs for a rope, the respective leg ends each being bevelled toward the face where the legs of a pair come nearly together to facilitate the introduction of a rope between the legs.

5 Claims, 7 Drawing Figures

U.S. Patent
Sep. 16, 1980
4,222,157
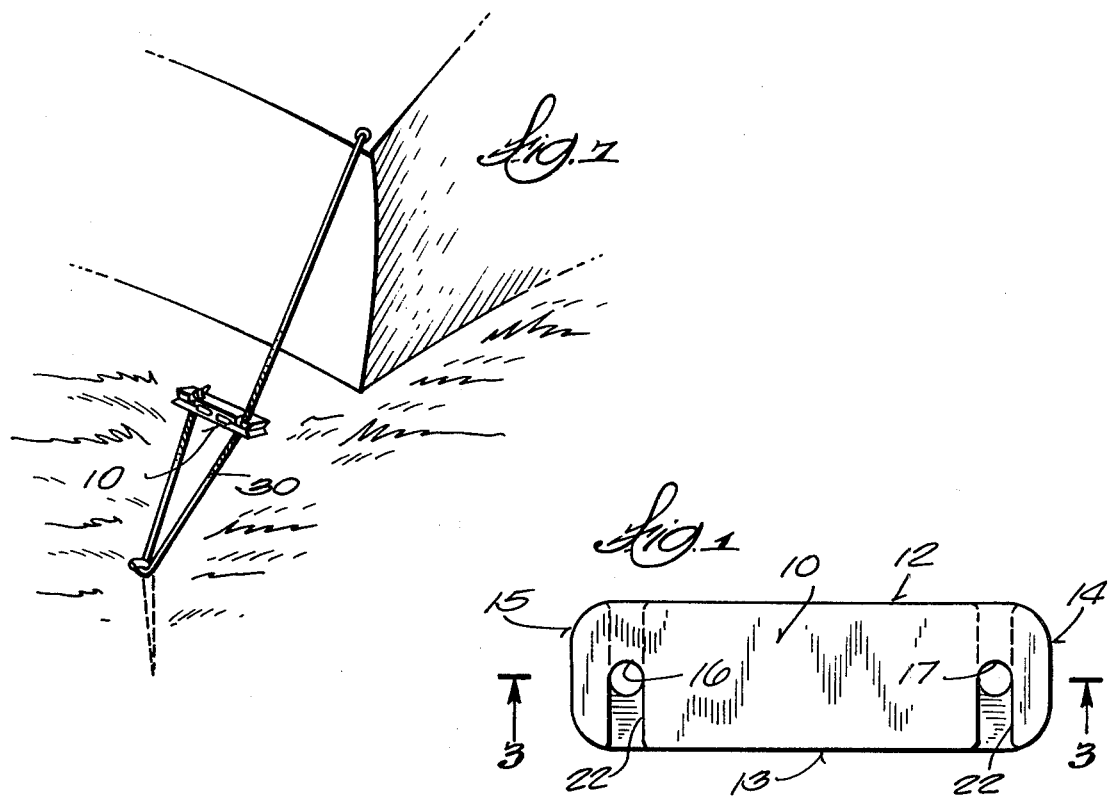
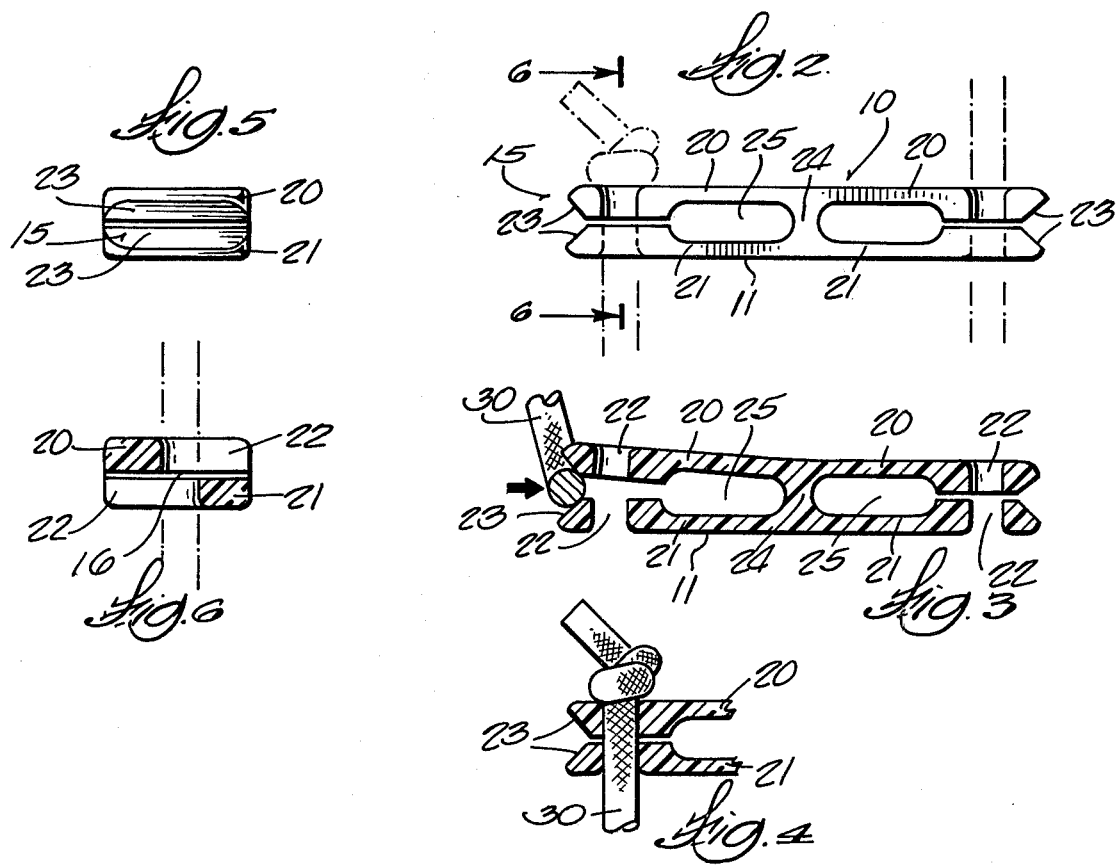

ROPE TIGHTENER

BACKGROUND OF THE INVENTION

A great many devices are known for use as rope tighteners. In one class of such devices a rope extends through a hole in the rope tightener which may be a simple wood bar. A loop or bight of rope then extends around a fixed object such as a tent stake and the free end of the rope is secured to a second hole in the rope tightener bar, for instance by a knot. When the wood bar is held by the user at right angles to the rope passing through it and pulled, the rope passes freely through the hole in the bar allowing the rope to be tightened. However, when the rope is released, the tension of the free end of the rope on the free end of the bar pulls the bar at a substantial angle to the axis of the rope thereby putting an S bend in the rope and locking the bar in place to retain whatever tension is placed on the rope.

Devices of various sorts to allow a solid object to be placed on or around a rope or a wire are also well known.

Applicant is aware of the following patents:

| Patent No. | Inventor | Dated |
|---|---|---|
| 666,400 | Tregoning | 1/22/01 |
| 878,949 | Hanson | 2/11/08 |
| 947,111 | Lorentz | 1/18/10 |
| 1,422,804 | Witte | 7/11/22 |
| 1,652,351 | Dyer | 12/13/27 |
| 1,896,705 | Geisenhoner | 2/7/33 |
| 3,050,803 | Hulterstrum | 8/28/62 |
| 4,010,569 | Finley et al | 3/8/77 |

SUMMARY OF THE INVENTION

The invention is a rope tightener consisting of a bar with holes at each end to receive a continuous run of rope and the end of the rope respectively, each of the holes being formed by a pair of mating legs preferably integrally formed from a single piece, for instance of plastic, but capable of being formed of other materials such as wood or metal. Each end of the rope tightener bar is preferably made up of a pair of legs in close proximity to each other. Each said leg is provided with a lateral or side-opening slot long enough to overlap the slot in the other leg of the pair approximately one rope diameter, to form the hole. The legs must normally be much closer to each other than one rope diameter. The respective slots in each leg of a pair of legs open from the opposite sides of the respective legs, so that they overlap each other only at the longitudinal center line of the rope tightener to form the hole. Preferably the slots are diametrically opposed and the hole formed where they overlap is circular, but other forms are possible. The sides of the hole are complete as viewed from the top or bottom surface, but a continuous unbroken rope may readily be forced between the legs from the end of the unit and the spring tension urging the legs to their normal position in face contact or almost in face contact with each other will snap the rope into the hole as the device is forced over the rope. In the same manner the rope may be removed from the hole without either cutting the rope or disassembling the rope tightener (which is preferably integral in any case) by pulling the rope tightener in the direction of its long axis and pulling the rope in the opposite direction while twisting the tightener to align the slot with the rope. Preferably the ends of the respective legs of a pair are inwardly bevelled toward the center line where the two legs come together to facilitate the insertion of a rope.

Preferably the material of the rope tightener is made of a naturally resilient substance so that when the legs of a pair are forced apart they naturally tend to return to the original conformation.

In its most useful form pairs of legs are provided at each end of the rope tightener although a single pair of legs may be provided in a rope tightener having a conventional hole or other means to secure the end of a rope at the other end.

DRAWINGS

FIG. 1 is a top plan view of the rope tightener of this invention.

FIG. 2 is a side elevational view.

FIG. 3 is a cross sectional view on line 3—3 of FIG. 1.

FIG. 4 is a fragmentary view taken along line 3—3 with a rope disposed as in FIG. 2.

FIG. 5 is an end view.

FIG. 6 is a cross sectional view on line 6—6 of FIG. 2.

FIG. 7 is a perspective view of the corner of a tent showing the rope tightener of this invention in use to tighten a tent rope.

DETAILED DESCRIPTION

Although the disclosure hereof is detailed and exact to enable those skilled in the art to practice the invention, the physical embodiments herein disclosed merely exemplify the invention which may be embodied in other specific structure. While the best known embodiment has been described, the details may be changed without departing from the invention, which is defined by the claims.

In its overall shape the rope tightener of this invention is a bar, like the rope tighteners of the prior art. Its long dimension between the rope holes is sufficient so that it may be grasped readily, and so that the free end of the rope will pull on the bar and cause the bar to stand at an acute angle to the continuous rope through the other hole when under tension, in order to secure the bar against movement with respect to the continuous rope, all in a well-known way.

However, the hole in at least one end of the bar of this invention is provided by a novel structure which makes the rope tightener exceedingly easy to place and remove without making or untieing any knots, or cutting the rope, or making any change whatever in the rope. This permits a continuous run of rope to be placed in, or removed from, the hole.

In its preferred form shown in the drawings, the rope tightener consists of a bar having an upper surface 10, a lower surface 11, sides 12 and 13, and ends 14 and 15. Each end has a hole 16 or 17 formed partly in a leg 20 and partly in a leg 21, and spaced an appropriate distance from one another along the length of the rope tightener.

At least one end of the bar, and preferably both ends, consists of a pair of legs 20 and 21 which are mirror images of one another. Each leg is provided with a slot 22 extending from an edge 12 or 13 but the slot in leg 20 extends from one edge and the slot in leg 21 extends from the other. Each slot 22 extends laterally from its respective edge past the longitudinal center line of the respective leg a distance approximately equal to the radius of the rope size for which the rope tightener is designed so that the respective slots 22 overlap at 16 or 17 to to form a hole to receive a rope. The width of each slot 22 is substantially that of the diameter of the rope 30. Preferably the end of each leg 20 or 21 has an inwardly bevelled end 23 to aid in placing a rope between the legs as shown best at FIG. 3. The four legs which form the preferred form of my device are connected by a laterally extending central web 24. Preferably the entire device is integral and is formed from a tough resilient material. Some plastics, such as ABS, and some woods such as oak are suitable. Because of the resilience of the material the legs 20 and 21 return nearly or entirely to contact with each other after being deformed. If desired or appropriate for the particular material, the portions between the center webs 24 and the holes 16 and 17 may be relieved by providing cavities 25 but this is not essential to the invention. One helpful effect of the cavity 25 is to reduce the force necessary to deflect legs 20 and 21. The cavities 25 also reduce the weight and volume of plastic needed.

To insert a rope in the rope tightener of the invention, the rope 30 is placed at the end of the unit. Surfaces 23 help deflect legs 20 and 21 outwardly from each other so that the rope 30 may enter the space where slots 22 are provided in the respective legs. When rope 30 reaches slots 22 the resilience of legs 20 and 21 snap the legs together so that the rope occupies the slots rather than forcing the legs 20 and 21 apart. At that point the rope passes through the hole 16 or 17 formed by the respective slots 22. To remove the rope it is necessary to first twist so that the rope is oriented to run along slots 22 rather than at right angles to them. The user then exerts an endwise force on the rope and on the rope outwardly from the center of the rope tightener and on the rope tightener in the other direction. The legs 20 and 21 will spring apart and permit the rope to snap out of the opening.

The manner in which the two slots 22 are superimposed to form a hole 16 or 17 is best shown in FIG. 6, where the two slots 22 overlap to form holes 16 at the center through which rope 30 passes. As shown there is a slight gap between legs 20 and 21 at each pair but if desired, the device may be made so that the legs touch one another in their relaxed position. In either case, the natural resilience of the material, and the fact that in its operative position the rope is at right angles to the slots 22 and the legs 20 and 21 act to insure that the rope will remain in its proper position for as long as desired while a quick twist at the pole will remove it when removal is desired.

I claim:

1. In a rope tightener comprising a body provided with means at one end to secure the end of a rope and at least a hole at the other end of the body to receive the center of a rope which rope is to be tightened between an object holding the loop of rope between the center and secured end and another object attached to the free end of the rope, the improvement comprising:

a pair of legs each having a surface adjacent the other leg in the unstressed position of said legs, each said leg being provided with a slot all the way through the thickness of the material of the leg and extending from the side of the leg over the slot of the other leg, the respective legs having their respective slots extending from opposite sides and said slots cooperating to form a hole for reception of said rope, said sides or legs being capable or resilient deflection to permit a rope to pass between the legs.

2. The device of claim 1 in which a said pair of legs and a said pair of slots are provided at each end of the tightener.

3. The device of claim 1 in which the parts of the rope tightener are integral.

4. The device of claim 1 in which the ends of the respective legs are bevelled inwardly toward the surface at which the legs are closest to each other.

5. The device of claim 1 in which the slots in the respective legs of a pair extend in diametrically opposed directions, the overlap being at the longitudinal center of the body.

* * * * *